May 27, 1958

C. G. HEDÉN 2,836,434

ARRANGEMENT FOR STERILE INTERCONNECTION AND SEALING OF
APPARATUSES IN A PLANT FOR INSTANCE
FOR CULTIVATION OF BACTERIA

Filed Aug. 20, 1953

INVENTOR.
Carl Göran Hedén
BY

United States Patent Office 2,836,434
Patented May 27, 1958

2,836,434

ARRANGEMENT FOR STERILE INTERCONNECTION AND SEALING OF APPARATUSES IN A PLANT FOR INSTANCE FOR CULTIVATION OF BACTERIA

Carl Göran Hedén, Stockholm, Sweden, assignor to Aktiebolaget Separator, Stockholm, Sweden Application August 20, 1953, Serial No. 375,348

Claims priority, application Sweden August 21, 1952

4 Claims. (Cl. 285—41)

In cultivation of bacteria, it is of great importance that different apparatuses, e. g. cultivation tanks, store tanks, heat exchangers and centrifuges, can be sterilely connected with each other. This means that bacteria must not "grow out" of the apparatus through the connection means and, respectively, must not "grow inwards" therethrough from the air. When working with disease-producing bacteria, the first-mentioned possibility may involve risks, while, on the other side, any bacteria that may enter from the air may destroy a cultivation medium present in the apparatus. A common connection, e. g. an elastic tube pressing against a sealing surface is not satisfactory, int. alia because it has proved that, even in case of a high application pressure and long sealing surfaces, the bacteria after a shorter or longer time grow, nevertheless, along the surfaces. The case is the same, if an apparatus is to be sealed.

The object of the present invention is to remove said inconvenience and to make an arrangement that complies with the requirements for a sterile as well as simple and handy connection or sealing, with the aid of which apparatuses quickly can be connected with, or detached from, one another.

The arrangement according to the invention is characterized by comprising a connection casing, the hollow space of which, communicating with the interior of the apparatus, has a conical surface and a pressure means which is adapted to press a tube against the conical surface along at least two closed peripheral lines in such a way that therebetween is formed a closed interspace which through apertures in the casing communicates only with one or more conduits for a sterilizing agent, suitably overheated steam.

Figure 1:
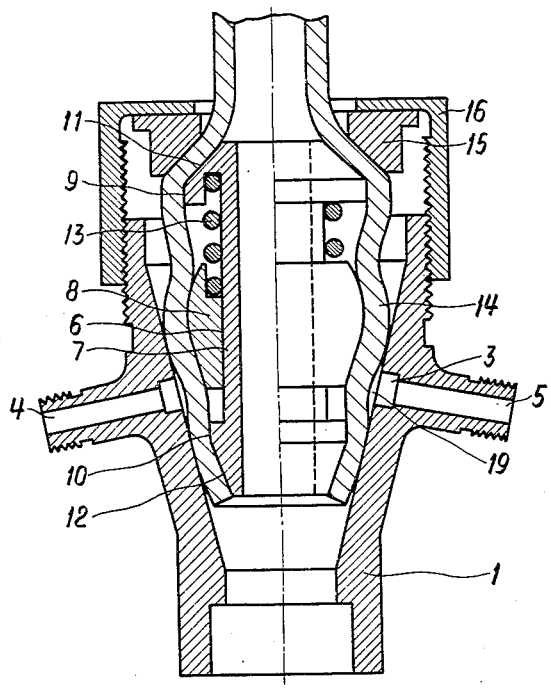
Figure 2:
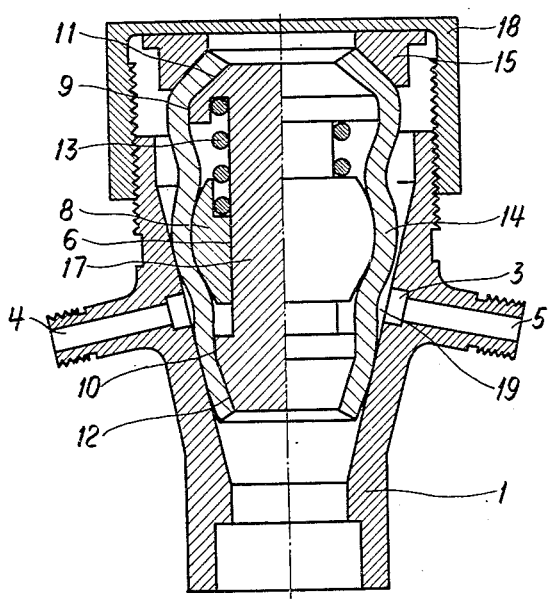

Two embodiments of the invention are diagrammatically illustrated on the attached drawing, in which Fig. 1 shows one embodiment, in longitudinal section, which is designed to be used as a tube connection, and Fig. 2 shows the other embodiment which is designed for sealing of apparatuses.

In Fig. 1, 1 designates a connection casing, which is designed for application on an arbitrary apparatus in a plant for cultivation of bacteria. The casing has a hole extending therethrough with a conical surface 2 which is provided with a peripheral groove 3. The groove communicates with pipe connections 4 and 5 for intermittent introduction of a sterilizing agent, e. g. overheated steam. In the casing 1, a pressure means 6 is fitted which consists of a tubular inner part 7 and an outer ring 8 displaceably guided thereon. The inner part 7 is at its ends provided with flanges 9, 10, the outermost edge portions of which are conically bevelled at 11 and 12, respectively. The ring 8 suitably has a spherical outer surface and a larger diameter than the flange 10. A helical spring 13 is inserted between the flange 9 and the ring 8 so that the latter is pressed towards the flange 10. An elastic tube 14 is passed over the means 6 in such a way that, when the latter is displaced downwards, said tube is pressed against the conical surface 2 on either side of the groove 3 by the flange 10 and the ring 8, respectively, and forms a sealed chamber 19. Said displacement is effected by means of a pressure ring 15 which, when screwing a screwable gland 16 on the casing 1 transmits the pressure to the flange 9. The ring 8 first presses the tube against the conical surface 2 along a circle above the groove 3. When the ring 8 cannot be displaced any further downwards because, by means of the tube, it rests against the conical surface 2, the spring 13, during continued downward displacement of the inner part 7, will continue being compressed until the flange 10 presses the tube 14 against the wall of the conical surface 2 along another circle below the groove 3. The advantage of this arrangement is that the pressures on both the sealing places may be adjusted independently of one another so that the chamber between these surfaces becomes pressure-tightly sealed. The overheated steam circulating in the groove obstructs the passage for propagation of the bacteria outwards as well as inwards.

The arrangement shown in Fig. 2 for sealing an apparatus differs from the arrangement according to Fig. 1 only in that the tubular inner part 7 is replaced by a solid part 17 which is of the same outer shape as part 7. The sealing is established in the same way as in the first embodiment with the aid of an elastic tube portion which is pressed against the conical surface 2 but the length of which is approximately the same as the length of the pressure means 6. There is no hole extending through the gland 18, either, so that the housing is entirely sealed.

The arrangement is very easy to handle and makes it possible by means of sterile tubes and stoppers in the shortest possible time to connect different apparatuses with each other or to seal them individually, the enclosed medium coming into contact with no packing material but the tube, and the demands for sterility being complied with.

The invention is of course not limited to the embodiment shown. It is possible, for instance, to arrange more than two sealing surfaces with a corresponding number of parts displaceable relative to each other, which may be formed not only with spherical or conical but also with arbitrary rotation surfaces. Likewise, the arrangement is not confined only to apparatuses for cultivation of bacteria but it is fit for use wherever it is desired to delimit pressure-tightly a chamber by means of sealings.

I claim:

1. In a sterile sealing device of the character described, the combination of a casing having an interior space and at least one opening forming a fluid passage communicating with said space, the casing having a conical inner surface surrounding said space, an elastic tube in said space, means movable within said tube for pressing the elastic tube outward against said conical surface along two closed peripheral zones which are spaced from each other, the elastic tube partly defining an annular interspace between said zones, and means forming a separate passage leading through the casing to said interspace for introducing a sterilizing agent into the interspace, said conical surface and elastic tube forming said interspace including an annular groove surrounding the elastic tube, the casing having another separate passage leading from said groove for withdrawing the sterilizing agent from the interspace.

2. In a sterile sealing device of the character described, the combination of a casing having an interior space and at least one opening forming a fluid passage communicating with said space, the casing having a conical inner surface surrounding said space, an elastic tube in said space, means movable within said tube for pressing the elastic tube outward against said conical surface along two closed peripheral zones which are spaced from each other, the elastic tube partly defining an annular interspace between said zones, means forming a separate passage leading through the casing to said interspace for introducing a sterilizing agent into the interspace, said pressing means including a member having a part engaging the elastic tube around the inner surface thereof within one of said zones, an annular member slidably mounted on the first member and engaging the tube around the inner surface thereof within the other of said zones, and a spring urging the annular member in the direction of the smaller diameter portion of the conical surface.

3. In a sterile sealing device of the character described, the combination of a casing having an interior space and at least one opening forming a fluid passage communicating with said space, the casing having a conical inner surface surrounding said space, an elastic tube in said space, means movable within said tube for pressing the elastic tube outward against said conical surface along two closed peripheral zones which are spaced from each other, the elastic tube partly defining an annular interspace between said zones, means forming a separate passage leading through the casing to said interspace for introducing a sterilizing agent into the interspace, said pressing means including a pair of relatively movable members engaging the elastic tube around the inner surface thereof within the respective zones, and an adjustment member on the casing operatively connected to one of the pressing members for adjusting it relative to said conical surface.

4. In a sterile sealing device for the character described, the combination of a casing having an interior space and at least one opening forming a fluid passage communicating with said space, the casing having a conical inner surface surrounding said space, an elastic tube in said space, means movable within said tube for pressing the elastic tube outward against said conical surface along two closed peripheral zones which are spaced from each other, the elastic tube partly defining an annular interspace between said zones, means forming a separate passage leading through the casing to said interspace for introducing a sterilizing agent into the interspace, said pressing means including a pair of relatively movable members engaging the elastic tube around the inner surface thereof within the respective zones, an adjustment member on the casing operatively connected to one of the pressing members for adjusting it relative to said conical surface, and a spring urging the other pressing member toward the conical surface.

References Cited in the file of this patent

UNITED STATES PATENTS

| 739,589 | Clifford | Sept. 22, 1903 |
| 743,401 | Sherman | Nov. 3, 1903 |
| 1,994,169 | Comins | Mar. 12, 1935 |
| 2,485,497 | Lemley | Oct. 18, 1949 |

FOREIGN PATENTS

| 16,532 | Great Britain | Oct. 3, 1896 |
| 554,029 | Great Britain | June 16, 1943 |
| 1,082,007 | France | June 16, 1954 |